April 30, 1957 W. F. COLLINS ET AL 2,790,538
SPRING TOOTH MOUNTING
Filed April 2, 1953

INVENTORS
WILLIAM F. COLLINS
JAMES J. DRYAN

Paul O. Pippel

ATTORNEYS

2,790,538

SPRING TOOTH MOUNTING

William F. Collins, Downers Grove, and James J. Dryan, Chicago, Ill., assignors to International Harvester Company, a corporation of New Jersey Application April 2, 1953, Serial No. 346,476

4 Claims. (Cl. 198—198)

This invention relates to the construction of a rake or conveyor tooth and the mounting thereof.

A general object of the invention is to devise a rake tooth and mounting therefor which is particularly adaptable for use on an endless chain conveyor.

A more specific object of the invention is to devise a novel mounting wherein the resiliency of the spring tooth is utilized to effect a tight connection with the mounting so that the tooth is held firmly in position despite the pulling and vibration to which the tooth is subjected.

A still further object of the invention is to devise such a novel mounting which is inexpensive to manufacture and extremely simple to assemble and disassemble.

These and other objects of the invention will become more apparent from the specification and the drawings, wherein.

Figure 1:
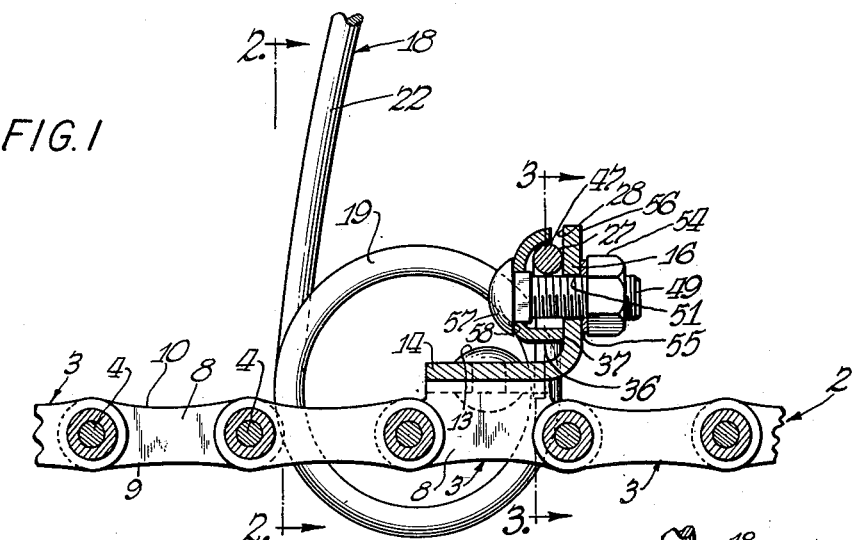
Figure 1 illustrates the novel mounting and spring tooth in association with a chain, the view being in section taken substantially on the line 1—1 of Figure 2.
Figure 2:
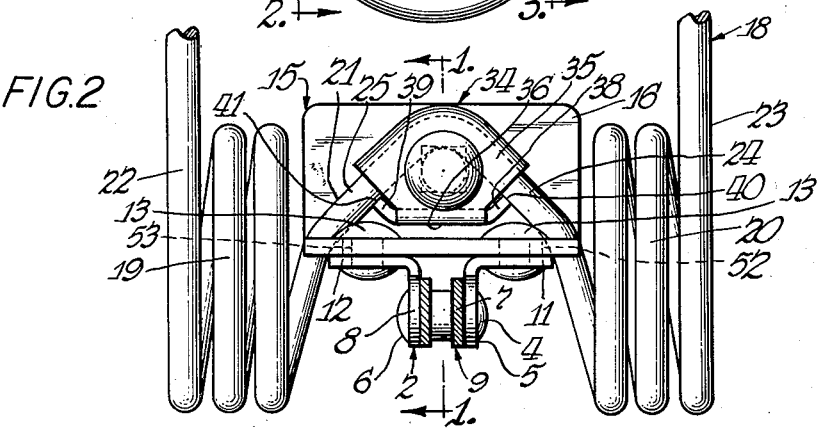
Figure 2 is a transverse sectional view taken substantially on the line 2—2 of Figure 1.
Figure 4:
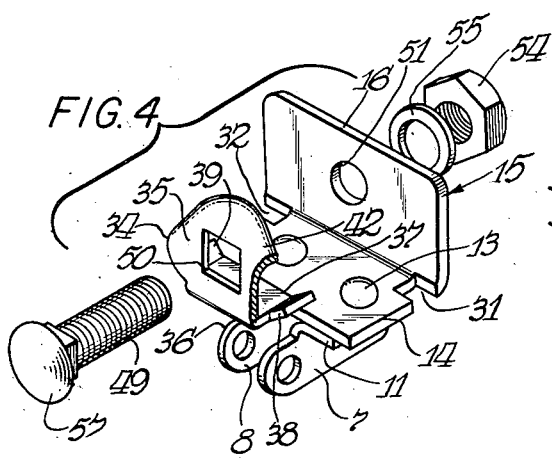
Figure 3:
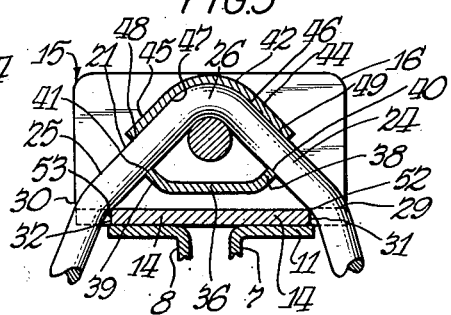
Figure 3 is a transverse sectional view taken substantially on the line 3—3 of Figure 1, and Figure 4 being an exploded isometric view of the mounting assembly with the clamp partially broken away.

Describing the invention in detail, the chain 2 comprises a plurality of link members 3, 3 articulatingly interconnected on generally parallel axes 4, 4 and each link member 3 comprises, at laterally opposite sides 5 and 6 of the chain, a pair of laterally spaced link members or pieces 7 and 8. The chain has an inner side 9 which is adapted to ride about an associated sprocket and an outer side 10.

The side members 7 and 8 of certain of the links 3 are projected outwardly of the outer side 10 of the chain and are each formed with laterally oppositely outturned, transverse lugs 11 and 12, respectively, which are disposed substantially coplanar and generally normal to the sides 5 and 6 of the chain.

The lugs 11 and 12 seat a flat plate fastening section or flange 14 of a carrier or spring tooth support element generally designated 15, which, being an angle member, comprises a flat mounting plate section or portion 16 extending generally normal to the flange portion 14 in a direction outwardly of the outer side 10 of the chain. The lugs and plate 14 are fastened together by rivets 13, 13.

The plate section 16 mounts a spring tooth generally designated 18 which comprising a pair of coaxial coils 19 and 20 which, at their adjacent ends, are interconnected by a loop or bridge 21 and at their outer ends are formed with tines or prongs 22 and 23 respectively. The bight or bridge 21 comprises a pair of angularly related straight legs or portions 24 and 25 which at their juncture form an apex 26, the legs 24 and 25 lying in a single plane and seated at one side as at 27 against an opposed flat side 28 of the plate section 16. It will be seen that the legs 24 and 25 are angled more sharply toward each other intermediate their ends as at 29 and 30 respectively and these regions 29 and 30 substantially coincide with the plane of the plate portion 14 through which the legs 24 and 25 extend transversely within notches or slots 31 and 32 respectively in the lateral edges of the plate 14.

A clamp member 34 is disposed against the opposite side of the bridge portion 21 and comprises a generally triangular body portion 35 which spans across the apex 26 and the adjacent portions of the legs 24 and 25. The clamp member 35 is provided with a spreader flange 36 extending from the body portion 35 within the loop 21 between the legs 24 and 25 and having an edge 37 seated against the side 28 of the plate 16 for limiting movement of the clamp 34 toward the plate 16. The flange 36 has a pair of lateral wing portions or extensions 38 and 39 angled substantially normal to the leg portions 24 and 25 and in engagement therewith as at 40 and 41, respectively, with the internal sides of said legs 24 and 25. The clamp member 34 has a peripheral flange 42 extending from the two adjacent edges of the body portion 35 toward the plate 16 without the loop 21 and presenting angularly related portions 44 and 45 generally paralleling the legs 24 and 25 respectively and joined over the apex 26. These portions 44 and 45 present internal curved surfaces 46 and 47 which project at an obtuse angle with respect to the plane of the body portion 35 as well as the plate 16 and these surfaces 46 and 47 have a wedging action with the external surfaces 48 and 49 on the external sides of the legs 24 and 25 whereby when the clamp member is drawn up against the plate 16 through the medium of the bolt 49 which extends through aligned openings 50 and 51 in the body portion 35 and plate 16, the round spring wire of the bridge portion 21 is wedged between the flange 42 and the plate 16 and is urged in a direction toward the flange 36 against the spreading resistance of the legs 24 and 25 as supplemented by engagement of the legs at 52 and 53 at opposite lateral edges of the plate 14. This action holds the tooth 18 in tight engagement with the clamp 34 and tightly against the plate 16 and also holds the bolt 49 in tightly locked condition. It will be noted that by passing the legs 24 and 25 through slots 31 and 32 in the plate 14 the chain is loaded close to its neutral axis and the spring tooth is prevented from rotating about bolt 49. It will be seen that the axes 53 of the coils 19 and 20 are disposed inwardly of the plate 14 along the outer side 10 of the chain.

In order to facilitate assembly and disassembly the opening 50 in the body portion 35 of the clamp is preferably made square to fit a square portion of the shank of the bolt to prevent the bolt from turning when the nut 54 is tightened through a washer 55 against the outer side of the plate 16 while the head 57 of the bolt is urged at 58 against the external side of the body portion 35 of the clamp.

It will be understood that the angular disposition of the legs 24 and 25 before assembly with the clamp 34 is at a slightly greater or smaller angle than that of the portions 44 and 45 in order to achieve the wedging action against the spring resistance of these legs to conform to the angularity of the portions 44 and 45 as well as to the resistance to the spreading action of the legs 24 and 25 by the piece 36 as the legs are being pushed thereonto.

What is claimed is:

1. In combination, an angle member having a substantially flat fastening part and a generally flat mounting plate extending angularly thereto, a spring wire rake element in the form of a pair of coaxial coils having adjacent ends connected by a loop and having remote ends with tines extending therefrom, said loop comprising a pair of interconnected angularly related legs defining an apex at their juncture said legs positioned in straddling relation to said fastening part crosswise thereof and engaging opposite edges thereof and seated at one side against the adjacent side of said mounting plate, a clamp having a generally flat body portion seated against the opposite side of said legs across said apex and having a peripheral flange extending toward said plate about said apex, said flange presenting an internal surface converging with said adjacent side of the plate in a direction away from said fastening part and in wedging engagement with the opposing periphery of said loop, said body portion and said plate having aligned openings, and a securing bolt extending through said openings and said loop and adapted to draw said clamp against said plate and said flange surface into wedging engagement with said loop whereby said legs are wedged toward said part, said part having notches at opposite edges receiving respective legs therein.

2. In a mounting for a round wire spring tooth having a pair of coils interconnected at one end by a bight lying in a single plane, and tines on the other ends of the coils, a carrier comprising a generally flat mounting section seated against one side of the bight, said bight comprising a pair of interconnected angularly related legs, a clamp having a body portion seated against the opposite side of the bight and having a flange extending between said legs from the body portion toward said section in spreading relationship to the legs and having opposite ends engaging said legs, wedge means on said body portion in wedge engagement with said legs at areas opposite that engaged with said flange and in wedging relation to said legs with said flat mounting section of said carrier, means connecting said clamp to said section of said carrier and drawing them together, and said carrier having another section extending between said legs and disposed in alignment axially with said coils and in holding engagement with said legs against movement transversely of said plane.

3. In combination, a support comprising a flat plate, a spring wire rake tooth having a loop portion including a pair of angularly related interconnected legs lying in a single plane and seated at one side against said plate, a clamp having a body portion seated against the opposite side of the loop, a flange extending from said body portion toward said plate within said loop between said legs and having opposite end portions extending substantially normal to respective legs and in engagement therewith, a flange extending from said body portion without the loop toward said plate said last-mentioned flange having side portions extending substantially perpendicular to respective end portions of said first-mentioned flange in paralleling relation to respective legs, said last-mentioned flange and said loop and said plate and loop having mutually engaging wedge faces formed and arranged to develop a wedging action therebetween in a direction urging said loop in said plane toward said first-mentioned flange pursuant to movement of said clamp toward said plate, and means operatively associated with said clamp and said plate for drawing them together.

4. A clamp for a device of the class described comprising a generally flat body portion substantially triangular in elevation and having three edges, a flange extending transversely from one side of said body portion along two adjacent edges thereof and presenting an internal wedge surface disposed at an obtuse angle to said one side, said flange including two side portions paralleling respective edges and a spreader flange projecting from said one side of the body portion transversely thereof along the third edge and having opposite end portions spaced laterally from adjacent ends of respective said side portions of said first-mentioned flange to provide accommodation spaces for an associated spring tooth portion said end portions of said spreader flange extending outwardly of said third edge and disposed substantially normal to respective adjacent side flanges.

References Cited in the file of this patent

UNITED STATES PATENTS

| | | |
|---|---|---|
| 349,147 | Durand | Sept. 14, 1886 |
| 565,738 | Gillifand et al. | Apr. 11, 1896 |
| 1,296,883 | Van Cott | Mar. 11, 1919 |
| 2,237,002 | Kelley | Apr. 1, 1941 |
| 2,514,560 | Scranton | July 11, 1950 |
| 2,526,960 | McElhinney et al. | Oct. 24, 1950 |
| 2,527,887 | Martin | Oct. 31, 1950 |